US008326509B2

(12) United States Patent
Logan et al.

(10) Patent No.: US 8,326,509 B2
(45) Date of Patent: Dec. 4, 2012

(54) METHOD FOR OPERATING A VEHICLE BRAKE SYSTEM USING BRAKE TEMPERATURE

(75) Inventors: Jon K. Logan, Howell, MI (US); Patrick J. Monsere, Highland, MI (US); Danny Y. Mui, Birmingham, MI (US); Margaret C. Richards, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 780 days.

(21) Appl. No.: 12/403,625

(22) Filed: Mar. 13, 2009

(65) Prior Publication Data

US 2010/0235065 A1   Sep. 16, 2010

(51) Int. Cl.
  *B60T 8/72* (2006.01)
(52) U.S. Cl. ........... 701/83; 701/70; 701/78; 303/191
(58) Field of Classification Search ............ 701/1, 70, 701/71, 78, 82, 83; 303/191, 122.03, 160; 188/1.11 E, 2 A, 79.52
See application file for complete search history.

(56) References Cited

U.S. PATENT DOCUMENTS

| | | | | |
|---|---|---|---|---|
| 3,297,368 | A * | 1/1967 | Cumming | 303/22.7 |
| 4,674,326 | A * | 6/1987 | Reinecke | 73/129 |
| 4,685,745 | A * | 8/1987 | Reinecke | 303/191 |
| 4,790,606 | A * | 12/1988 | Reinecke | 303/191 |
| 5,524,974 | A * | 6/1996 | Fischle et al. | 303/191 |
| 5,731,975 | A * | 3/1998 | Nakashima | 701/83 |
| 6,254,203 | B1 * | 7/2001 | Arnold | 303/177 |
| 6,270,172 | B1 * | 8/2001 | Shirai et al. | 303/152 |
| 6,425,643 | B2 * | 7/2002 | Shirai et al. | 303/112 |
| 6,612,736 | B2 * | 9/2003 | Lee et al. | 374/153 |
| 6,671,604 | B1 * | 12/2003 | Frentz et al. | 701/70 |
| 6,804,598 | B2 * | 10/2004 | Eckert et al. | 701/70 |
| 6,859,712 | B2 * | 2/2005 | Walenty et al. | 701/71 |
| 6,913,328 | B2 * | 7/2005 | Eckert et al. | 303/191 |
| 7,152,935 | B2 * | 12/2006 | Kinder et al. | 303/191 |
| 7,165,657 | B2 | 1/2007 | Palladino | |
| 7,347,304 | B2 * | 3/2008 | Nilsson et al. | 188/158 |
| 7,357,465 | B2 | 4/2008 | Young et al. | |
| 7,883,159 | B2 * | 2/2011 | Miyazaki | 303/191 |
| 2001/0052727 | A1 * | 12/2001 | Betts | 303/191 |
| 2005/0216160 | A1 * | 9/2005 | Zumberge et al. | 701/70 |
| 2006/0220449 | A1 * | 10/2006 | Svensson | 303/20 |
| 2010/0131166 | A1 * | 5/2010 | Fuchs et al. | 701/75 |

FOREIGN PATENT DOCUMENTS

| | | | |
|---|---|---|---|
| JP | 5092760 | * | 4/1993 |
| JP | 2001039280 | * | 2/2001 |
| JP | 2005319913 | * | 11/2005 |

OTHER PUBLICATIONS

Wikipedia, Brake-by-wire, 5 pages, http://en.wikipedia.org/wiki/Brake-by-wire.

* cited by examiner

*Primary Examiner* — Gertrude Arthur Jeanglaude

(74) *Attorney, Agent, or Firm* — Lionel D. Anderson; Reising Ethington P.C.

(57) ABSTRACT

A method that compensates for temperature-related effects in a vehicle brake system. According to one embodiment, the method determines the temperature of a brake pad, calculates a temperature-based modifier, and then uses the temperature-based modifier to adjust one or more brake command signals provided to the vehicle brake system so that they are compensated for temperature-related changes in the coefficient of friction (µ) of the brake pad and rotor. The method may be used with brake-by-wire systems such as electrohydraulic braking (EHB) systems and electromechanical braking (EMB) systems.

19 Claims, 2 Drawing Sheets

METHOD FOR OPERATING A VEHICLE BRAKE SYSTEM USING BRAKE TEMPERATURE

TECHNICAL FIELD

The present invention generally relates to vehicle brake systems and, more particularly, to a method that can compensate for temperature-related effects in a vehicle brake system.

BACKGROUND

There are numerous types of vehicle brake systems, including those that include hydraulically actuated disk brakes. In such a system, engagement of a brake pedal by a driver causes a hydraulic piston and caliper out at the wheel to pinch a rotor therebetween. The hydraulic piston and caliper each carry a brake pad which frictionally interacts with the rotor and can slow it down according to a number of factors, including the coefficient of friction ($\mu$) of the materials.

The coefficient of friction of a brake pad and rotor can be affected by the temperature of the system. For example, if the brake pad is cold, the coefficient of friction can be quite high such that the brake pad grabs the rotor in an aggressive way; this condition is sometimes referred to as 'grabbing'. If the brake pad is hot, the coefficient of friction can decrease and the brakes can react in a less aggressive fashion. In some instances, the decreased coefficient of friction is significant enough that is noticed by the driver; this condition is sometimes referred to as 'sail on'.

SUMMARY OF THE INVENTION

According to one embodiment, there is provided a method for operating a vehicle brake system. The method may comprise the steps of: (a) determining a brake temperature; (b) determining a temperature-based modifier; (c) generating a modified brake command signal; and (d) operating the vehicle brake system according to the modified brake command signal.

According to another embodiment, there is provided a method for operating a vehicle brake system. The method may comprise the steps of: (a) determining a brake temperature; (b) determining a requested brake torque; (c) generating a modified brake command signal; and (d) operating the vehicle brake system according to the modified brake command signal.

According to another embodiment, there is provided a brake-by-wire vehicle brake system. The system may comprise: a brake pedal sensor for providing a brake signal; a brake temperature sensor for providing a temperature signal; an electronic brake control module (EBCM) coupled to the brake pedal sensor and to the brake temperature sensor; and a vehicle brake assembly having a brake pad and a rotor. The EBCM may use the brake signal and the temperature signal to generate a modified brake command signal that compensates for temperature-related changes in a coefficient of friction of the brake pad and the rotor.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
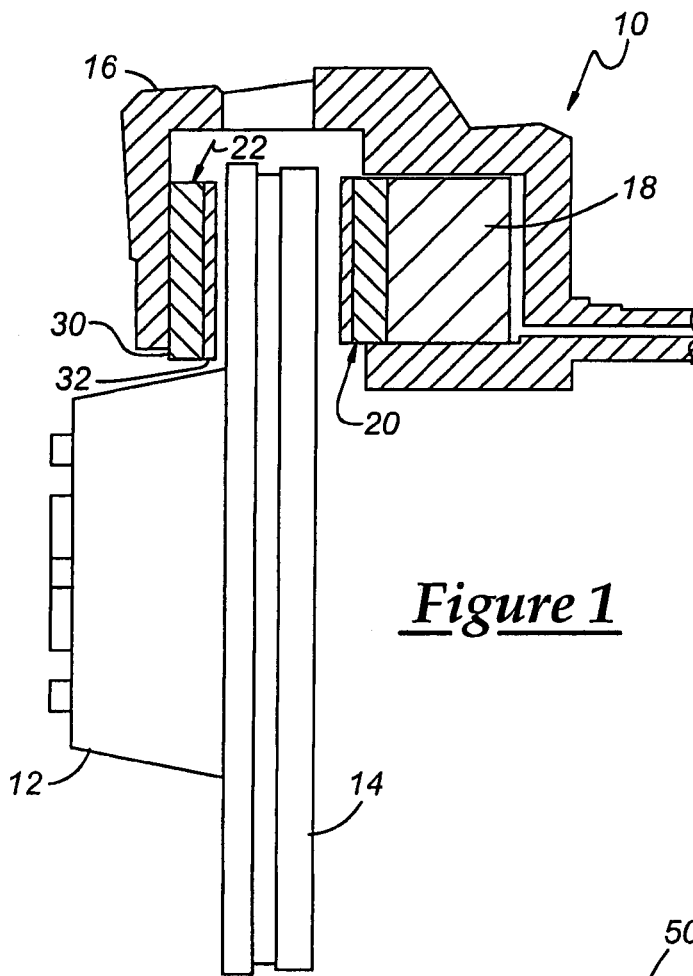
FIG. 1 is a schematic illustration of an exemplary disk brake assembly.

The method described herein compensates for temperature-related effects in a vehicle brake system, particularly a brake-by-wire system. According to one embodiment, the method determines the temperature of a brake pad, calculates a temperature-dependent modifier value, and then uses the modifier value to adjust command signals that operate the vehicle brake system. The modified or adjusted command signals may compensate for temperature-related changes in the coefficient of friction ($\mu$) of the brake pad and rotor. With reference to FIG. 1, there is shown a schematic illustration of an exemplary vehicle brake assembly 10 that includes hydraulically actuated disk brakes. It should be appreciated that the system and method described herein may be used with any vehicle brake system and is not limited to the exemplary embodiments shown and described here. This includes brake-by-wire systems such as electromechanical braking (EMB) systems and electrohydraulic braking (EHB) systems, drum brake systems, regenerative braking systems, as well as any other type of known vehicle brake system.

Vehicle brake assembly 10 generally includes a hub 12, rotor 14, caliper 16, piston 18, and pads 20, 22 and may be part of an electrohydraulic braking (EHB) system or other brake-by-wire system. As is appreciated by skilled artisans, a tire-wheel assembly (not shown) is attached to hub 12 with several lug nuts so that the tire, wheel, hub, and rotor can all co-rotate together. Rotor 14 is a disk shaped component that is located inboard of the wheel and may be cast or otherwise formed from a variety of materials including various metal alloys, ceramic composites, and other materials known in the art. Alternatively, vehicle brake assembly 10 could be part of an electromechanical braking (EMB) system that uses brake-by-wire technology to operate motor driven calipers, instead of an EHB system that uses brake-by-wire technology to operate hydraulically driven calipers.

Brake caliper 16 straddles rotor 14 and carries brake piston 18 so that a compressive and frictional force can be applied by brake pads 20, 22 to opposing sides of the rotor during a braking event. The frictional forces slow the rotation of rotor 14 and hence the rotation of the tire-wheel assembly and ultimately the vehicle. Different types of brake calipers may be used, including fixed calipers and floating calipers. A fixed caliper generally does not move with respect to rotor 14. A floating or sliding caliper, such as the one shown in FIG. 1, moves to and from rotor 14 during braking operations. More specifically, brake piston 18 pushes an inner brake pad 20 until it contacts an inner side of rotor 14. Additional force by brake piston 18 pulls the floating outer caliper component and outer brake pad 22 towards the outer side of rotor 14 until it makes contact and pinches the rotor between the inner and outer brake pads. This creates a frictional force that in turn slows rotation of the rotor and the wheel.

Brake piston 18 is mounted to brake caliper 16 and exerts a force that drives brake pads 20, 22 against opposing sides of rotor 14 in a compressive manner. In one embodiment where vehicle brake system 10 is part of an electrohydraulic braking (EHB) system, brake piston 18 is hydraulically coupled to a fluid pump that is controlled by an electronic module. In a more conventional embodiment, piston 18 may be hydraulically coupled to a master cylinder that is manually actuated by the driver's engagement of the brake pedal. Other embodiments for actuating or driving the vehicle brake assembly could also be used, including brake-by-wire and non-brake-by-wire applications.

Inner and outer brake pads 20, 22 are designed to frictionally interact with the inner and outer sides of rotor 14, respectively, and each includes a solid backing component 30 and a brake lining 32. There are numerous types of brake pad designs that may be used. For example, the two-pad arrangement shown in FIG. 1 (i.e., one brake pad per rotor side) could be replaced with a high performance alternative that utilizes more than two brake pads per rotor. Any suitable attachment mechanism may be used to attach brake lining 32 to backing component 30, including high-temperature rivets or adhesives. Brake lining 32 is the actual part of the brake pad that frictionally contacts rotor 14 and, depending on the embodiment, may be made of a relatively soft but tough and heat-resistant material having a high coefficient of friction ($\mu$) (e.g., 0.3-0.7). To illustrate, if a brake pad is pushed against the rotor with a brake force of 10,000 Newtons and a coefficient of friction ($\mu$) of 0.4, then an actual force of approximately 4,000 Newton will result (roughly 40% of the normal force on the brake pad is transferred to friction force on the rotating rotor). One suitable material that may be used in brake lining 32 is aramid (aromatic polyamide), although other materials may be used as well.

Figure 2:
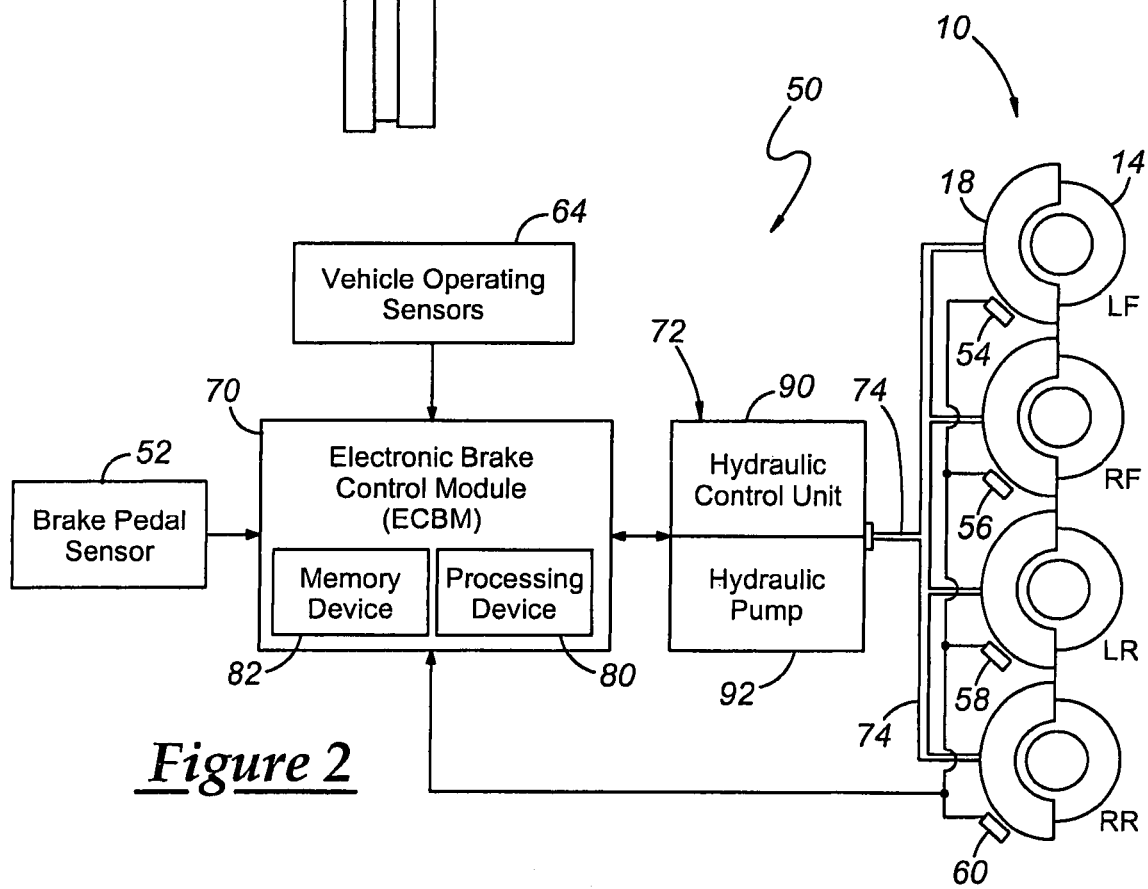
FIG. 2 is a block diagram of an exemplary vehicle brake system that may be used with the disk brake assembly of FIG. 1.

FIG. 2 is a block diagram of an exemplary vehicle brake system 50 that controls brakes associated with each of the wheels or corners of the vehicle. According to this exemplary embodiment, vehicle brake system 50 is an electrohydraulic braking (EHB) system and generally includes a brake pedal sensor 52, brake temperature sensors 54-60, one or more vehicle operating sensor(s) 64, electronic module 70, and hydraulic unit 72. It should be appreciated that vehicle brake system 50 is simply provided for purposes of illustration and that various alternative arrangements, including systems having more, less, or different components from those shown here could be used instead. For example, an electromechanical brake (EMB) system having separate electronic modules or controllers located at each of the vehicle wheels may be used; in such a system, a brake force is generated by electrically-driven calipers instead of a hydraulic system.

Brake pedal sensor 52 provides vehicle brake system 50 with a brake signal that is generally representative of the position, movement, exerted force, and/or state of a brake pedal (hereafter collectively referred to as 'brake status'). Any number of different types of brake pedal sensors may be used; these include non-contact-type sensors (e.g., optical sensors, electromagnetic sensors, etc.), contact-type sensors (e.g., potentiometers, contact switches, etc.), as well as those that measure the force that the driver exerts against the brake pedal, to name a few. In an exemplary brake-by-wire application, a brake pedal simulator may be used that includes a brake pedal mechanically coupled to a spring mechanism for conveying the expected mechanical feel to the driver, and one or more brake pedal sensors 52 electronically coupled to electronic brake control module (EBCM) 70 for conveying brake status information. The brake pedal simulator may also include other mechanical and/or electronic components, including other sensors, etc.

Brake temperature sensors 54-60 provide vehicle brake system 50 with temperature signals that are generally representative of the temperature of one or more components of vehicle brake assembly 10. In one embodiment, each of the brake temperature sensors 54-60 determines a brake lining temperature; this may be accomplished in one of a number of different ways. For example, brake temperature sensors 54-60 may be embodied in software so that they indirectly determine or calculate the anticipated brake lining temperature by using a thermal model and different inputs such as wheel speed, duration of a braking event, brake force, etc. This type of approach does not require a physical temperature sensor, as the brake temperature sensor is actually a collection of electronic instructions and/or data structures like look-up tables and the like. In another example, brake temperature sensors 54-60 include actual sensing elements, such as thermocouples, infrared sensors, etc., that are located near brake lining 32 and directly sense the temperature of the brake lining, rotor, and/or some other suitable brake assembly component. In another example, the temperature sensors may be provided by an electronic module like an antilock braking system (ABS) module, a traction control module, etc. Any suitable approach may be used to provide vehicle brake system 50 with information regarding the temperature of vehicle brake assembly 10.

Any number of additional sensors, components, devices, modules, etc. may be used to provide vehicle brake system 50 with information that pertains to vehicle operating conditions. Vehicle operating sensors 64 may include, for example, vehicle speed sensors, wheel speed sensors, acceleration sensors, yaw rate sensors, and steering wheel angle sensors, to name a few. It should be appreciated that one or more of the aforementioned sensors 52-64 could be embodied in hardware, software, firmware, or some combination thereof, and that they may be electronically coupled to electronic brake control module (EBCM) 70 via a direct electronic connection (as is schematically illustrated in FIG. 2), through other electronic components such as other modules, over a vehicle communications bus or network, or according to some other connection known in the art.

Electronic module 70 is an electronic device or unit that is located in the vehicle and may include an electronic processing device 80 and a memory device 82. The electronic processing device 80 may control some operational aspects of the vehicle's brakes by executing various electronic instructions, including those of the present method. Some examples of suitable electronic processing devices include digital and analog microprocessors, microcontrollers, application specific integrated circuits (ASICs), or any other processing device known in the art. Memory device 82 could include any type of electronic memory storage means and may be used to store some of the electronic instructions that make up the present method, as well as sensor readings, look-up tables, and any other data structure that may hold data used by the method described herein. According to one embodiment, electronic module 70 is an electronic brake control module (EBCM) that modulates brake pressure via command signals sent to hydraulic unit 72. Electronic brake control module (EBCM) 70 could be a separate electronic module or it could be integrated into a larger module, device, or system such as a traction control system or antilock braking system (ABS).

Hydraulic unit 72 is mounted in the vehicle and is coupled to a hydraulic system that can drive brake pistons 18 located at each of the vehicle wheels. Although hydraulic unit 72 is schematically shown here having a separate hydraulic control unit 90 and hydraulic pump 92 co-located with one another, it should be appreciated that these two devices could instead be integrated into a single unit, they could be separated from one another and connected by some type of communication means (e.g., the hydraulic control unit could be integrated within the EBCM or some other module), or they could be arranged according to some other arrangement known in the art. In an exemplary embodiment, hydraulic control unit 90 receives command signals from EBCM 70 and drives hydraulic pump 92 accordingly. The brake pistons 18 of each of the different vehicle brake assemblies (i.e., each of the vehicle wheels or corners) may be: all controlled in unison, controlled on a wheel-by-wheel basis, controlled in groups (e.g., the front wheels are controlled separately from the rear wheels), or controlled according to some other known method. The hydraulic control unit 90 may be electronically connected to EBCM 70 via a direct electronic connection, a vehicle communications network like a private controller area network (CAN) bus or high-speed local area network (LAN), or with some other communications medium.

In general operation, EBCM 70 receives inputs from the various sensors (e.g., sensors 52-64), processes the inputs according to one or more braking algorithms, and outputs command signals to hydraulic control unit 90. Hydraulic control unit 90 controls hydraulic pump 92 according to the command signals and modulates the hydraulic fluid pressure in supply lines 74 that lead to the different vehicle brake assemblies for each of the vehicle's wheels. In response to an increase in hydraulic fluid pressure, the brake pistons 18 extend outwards and push the brake pads 20, 22 with their brake linings 32 against rotors 14 so that a frictional stopping force is created therebetween. At the end of the braking event, the hydraulic control unit 90 may reduce the hydraulic fluid pressure in supply lines 74 so that brake pads 20, 22 can back off the rotors 14.

Figure 3:
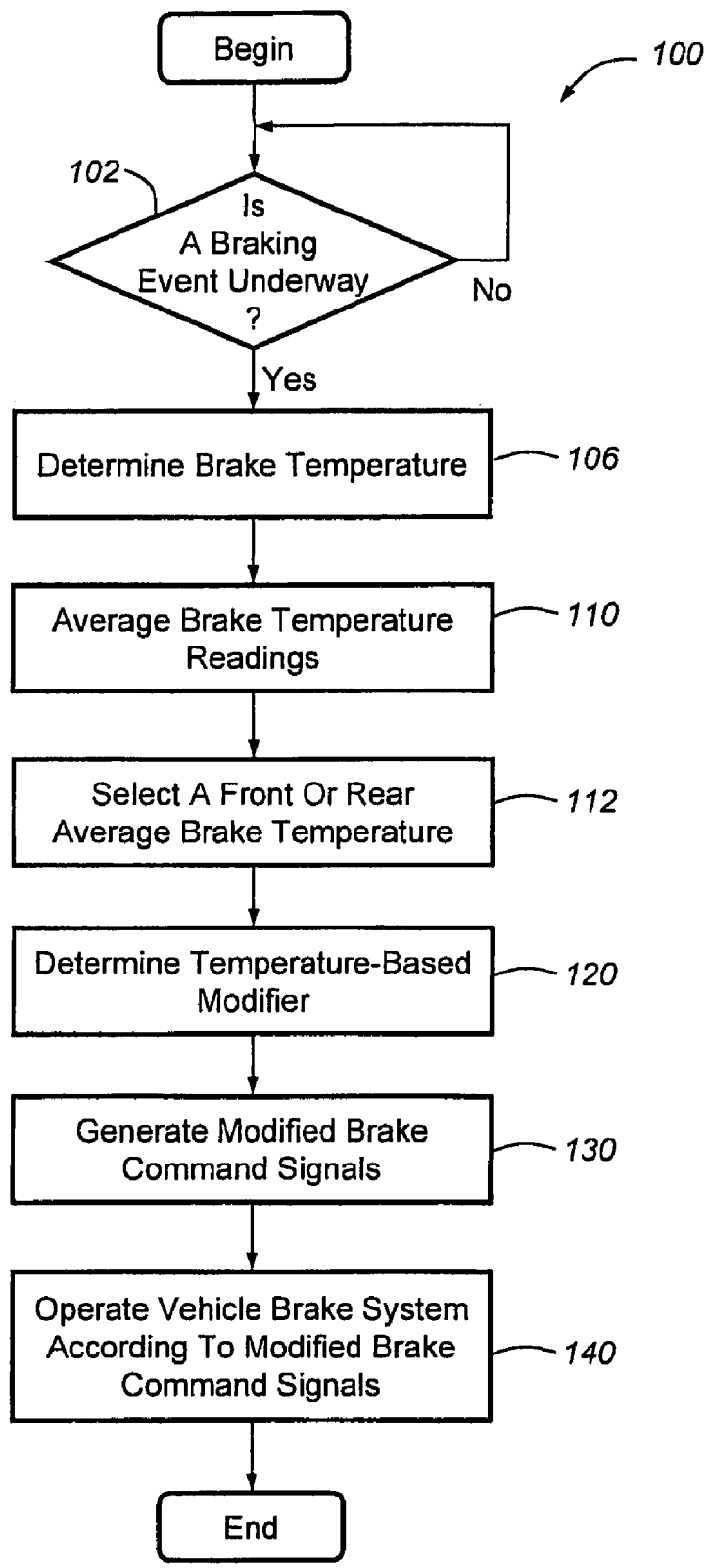
FIG. 3 is a flowchart of an exemplary method that may be used to operate the vehicle brake system of FIG. 2.

Turning now to FIG. 3, there is shown a flowchart of an exemplary method 100 for operating vehicle brake system 50 and, more particularly, for compensating for temperature-related effects in the vehicle brake assembly. As previously mentioned, when a brake lining is cold—such as at the beginning of vehicle operation—the coefficient of friction ($\mu$) can be quite high and the brakes can feel 'grabby' or overly aggressive to the driver. After the brake lining has warmed up, the coefficient of friction may decrease so that the brakes resume a 'normal' feel or response. If the brake linings become too hot, then a further decrease in the coefficient of friction may occur which could lead to an undesirable 'sail-on' condition where the brakes appear to be less responsive to the driver. In one embodiment, method 100 addresses the issue of temperature-related effects on the coefficient of friction by gathering temperature data for the brake linings, using the temperature data to calculate a temperature-based modifier, using the temperature-based modifier to provide modified command signals, and operating the vehicle brake system with modified command signals. Other embodiments are also possible.

Step 102 checks to see if a braking event is underway (i.e., is a braking event occurring or anticipated). Braking events may be manual or automatic in nature. For example, step 102 may receive brake signals from brake pedal sensor 52, where the brake signals are generally representative of the position, movement, exerted force, and/or state of the brake pedal (collectively the 'brake status'). In this example, the brake status information is indicative of a manual braking event; that is, when the driver manually engages the brake pedal. Alternatively, step 102 may gather information from certain modules and systems, such as an electronic stability control (ESC) module or an anti-lock braking system (ABS) module, in order to determine if the vehicle braking system is being automatically activated. In this example, the brake status information is indicative of an automatic braking event; that is, when a vehicle device, module or system automatically engages or operates the vehicle brakes. Any number of different techniques may be used to determine if a braking event is underway, including the use of wheel speed or vehicle speed data.

If no braking event is underway, then the method returns to step 102 for further monitoring. If a braking event is underway, then step 106 determines a brake temperature. The 'brake temperature' broadly includes any temperature, directly or indirectly determined, that is representative of a temperature of some part of the vehicle brake assembly. In one embodiment, the brake temperature is representative of the temperature of brake lining 32 and is directly sensed by thermocouples or other temperature sensors 54-60 that are embedded within or located in brake lining 32. In this example, temperature sensors 54 provide electronic brake control module (EBCM) 70 with temperature signals. In another embodiment, the brake temperature is representative of the temperature of brake lining 32, but instead of being directly sensed it is calculated or estimated from other operating conditions like wheel speed, duration of a braking event, applied brake force, etc. The calculated brake lining temperature may be provided to EBCM 70 by some other electronic module, etc. In another embodiment, the brake temperature is representative of the temperature of rotor 14 and may be used to further calculate or estimate the temperature of other vehicle brake assembly components, such as brake lining 32. The preceding examples only illustrate some of the sensors and techniques that may be used to determine brake temperature, as others could also be used.

It should be appreciated that separate brake temperatures may be determined for each brake lining 32 (i.e., two temperature readings per corner), a single brake temperature may be determined for each wheel (i.e., one temperature reading per corner), or a single brake temperature may be determined for the front or rear wheels (i.e., one temperature reading per two corners), to provide a few possibilities. Furthermore, the brake temperature readings may be provided on a periodic basis without being requested or they may be provided by brake temperature sensors 54-60 in response to a query from electronic brake control module (EBCM) 70 or some other device.

Step 110 averages the brake temperature data according to one of a number of different techniques. According to a first embodiment, step 110 gathers brake temperature data from all four wheels and averages the front wheels together since the front brake assemblies are likely experiencing similar conditions, and averages the rear wheels together since the rear wheels are probably experiencing similar conditions. This technique results in two average brake temperatures, one for the front and one for the rear and may be helpful for filtering out outlying temperatures, readings, etc. For each of the four wheels or corners, step 110 may use brake temperature data from the inner and/or outer brake pads 20, 22. In a different embodiment, step 110 gathers brake temperature data from all four wheels and then averages them all together. This technique results in a single averaged brake temperature for the entire vehicle. It should be appreciated that any suitable averaging technique may be used, including those using an arithmetic average, geometric average, harmonic average, median, quadratic mean, weighted mean, etc. Other signal processing steps may also be performed in step 110, including ones used for converting units, filtering, cleaning, or otherwise preparing the data for subsequent analysis.

In the example above where separate front and rear average brake temperatures are determined, it may be desirable to select one of these averages for subsequent processing, step 112. In one embodiment, step 112 selects an average temperature on a static basis that is determined during vehicle manufacture or at some other time (e.g., because of the design of the vehicle, the average temperature of the front brakes is always selected and used by the algorithm). In another embodiment, step 112 selects an average temperature on a dynamic basis (e.g., vehicle operating conditions such as speed, acceleration, steering angle, desired braking, etc. influence the selection process). In the case of dynamic selection, step 112 may receive input from a number of vehicle operating sensors 64 and use this information to determine if the front or rear average brake temperature is most appropriate for selection and use in the algorithm. It is possible for step 112 to compare the two average brake temperatures and select one based on that comparison. The exemplary selection techniques mentioned above are only some of the techniques that could be used in step 112, as any suitable method for selecting an average brake temperature may be employed. As already mentioned, it is not necessary to select between two average brake temperatures, as some embodiments may average all four wheels so that a single average brake temperature is determined, and some may use more than one brake temperature average so that a selection is not required.

Next, step 120 determines a temperature-based modifier using the average brake temperature derived in the previous steps. A 'temperature-based modifier' broadly includes any value, fraction, percentage, multiplier and/or other numerical quantity that may be used to compensate for temperature-related effects in the vehicle brake assembly, including temperature-related effects on the coefficient of friction of the brake pad and rotor. In one embodiment, step 120 uses a look-up table or other data structure to correlate average brake temperature to a temperature-based modifier, where the modifier can be used to compensate for changes in a default or baseline coefficient of friction value. For example, empirical testing may show that a specific brake pad and rotor combination has a baseline coefficient of friction ($\mu$) of 0.5 at 25° C., but that the coefficient varies according to the temperature of the brake lining. In this example, step 120 could use a two-dimensional look-up table where average brake lining temperature is the input and a temperature-based modifier value is the output. If the average brake temperature is 75° C. then a suitable modifier value could be 0.8 or 80%, for example, which results in a decreased coefficient of friction ($\mu$) of 0.4 (0.5*0.8=0.4). This temperature-based modifier is intended to compensate for the actual temperature-driven decrease in the coefficient of friction.

An exemplary range of temperature-based modifier values is 0.5 or 50% to 1.5 or 150%, although other values could certainly be used. Temperature-based modifier values less than 1.0 correspond to a decreased coefficient of friction, while modifier values greater than 1.0 correspond to an increased coefficient of friction. It should be appreciated that the correlation between temperature and coefficient of friction may vary from model to model or from vehicle to vehicle. Thus, it is not always the case that the lower the temperature the greater the coefficient of friction, as any number of different temperature/friction coefficient relationships may exist. Because of the infinite number of potential temperature/friction coefficient relationships, empirical testing may be helpful in establishing the look-up tables or other data structures.

It should be appreciated that the temperature-based modifier does not need to be solely based on the temperature of the brake lining, as it could also take the rotor temperature into account. The temperature-based modifier does not need to be a specific value or percentage, instead it could be the modified coefficient of friction (i.e., step 120 could provide the modified coefficient of friction value itself, 0.4 in the example above, instead of providing a multiplier). The temperature-based modifier does not need to be derived from a look-up table, but rather it could be algorithmically determined or modeled. It is also possible for step 120 to utilize a first look-up table to calculate a temperature-based modifier for the front brake pads, and to use a second look-up table to calculate a temperature-based modifier for the rear brake pads, or any other combination deemed appropriate. The preceding examples are only some of the possible alternatives that may be used to determine a temperature-based modifier, as any other technique may be used that can compensate for coefficient of friction changes that vary over a temperature range.

Step 130 generates modified brake command signals, where the modified brake command signals are at least partially influenced by the temperature-based modifier. Generally speaking, step 130 makes modifications to the brake torque that is requested manually by the driver or automatically by some module in order to compensate for temperature-related changes in the coefficient of friction of the brake pad and rotor. According to one embodiment, step 130 first determines the requested brake torque; again, the brake torque may be manually requested by the driver through engagement of the brake pedal, it may be automatically requested by an electronic module, such as an antilock braking system (ABS) module, etc. As already explained above, brake pedal sensor 52 can provide brake signals that convey brake status to electronic brake control module (EBCM) 70, as is known in brake-by-wire systems. The brake status information may then be translated into a requested brake torque.

Conventionally, a requested brake torque is mathematically converted into a requested brake force which may then be realized by sending command signals to either a hydraulically- or electrically-driven caliper. This causes the caliper to exert the requested brake or clamping force on the rotor. Because of the mechanical decoupling in a brake-by-wire system between the brake pedal and the source that exerts the brake force, step 130 is able to modify the command signals so that they are compensated for the above-described changes in the coefficient of friction. Consider the example where a driver engages a brake pedal in a brake-by-wire system so that brake pedal sensor 52 senses a requested brake torque of 1,100 N·m, the vehicle includes a rotor that is 0.3 m in diameter, and the baseline coefficient of friction between the brake pad and rotor is 0.5. The brake torque can be calculated according to the following equation:

$$\text{Brake torque}(N \cdot m) = \text{radius}(m) \cdot \text{Brake force}(N) \cdot \text{Coefficient of friction} \cdot \text{Number of Friction Surfaces} \quad \text{(Equation 1)}$$

where the radius (m) is the distance between the center of the rotor and the point at which the brake force is applied, brake force (N) is the clamping force being exerted by the brake pad against the rotor, the coefficient of friction is a dimensionless quantity that pertains to the amount of friction between the brake pad and rotor, and the number of friction surfaces corresponds to the number of interfaces where a normal force is applied and friction force is generated (in this example, two friction surfaces; one for each of the inner and outer brake pads 20, 22). According to Equation 1 and the exemplary values provided:

$$\text{Brake torque}(N \cdot m) = 1,100 N \cdot m = 0.15 m \cdot \text{Brake force}(N) \cdot 0.5 \cdot 2$$

This results in a brake force equal to approximately 7,333 N. Traditionally, a hydraulic pump or electrical motor would be driven so that it produces a brake force of 7,333 N; however, such an approach does not address temperature-related changes in the coefficient of friction. Thus, step 130 may use the temperature-based modifier described above when calculating the brake force. Consider the following example where the temperature-based modifier is 1.2 (suggests a higher expected coefficient of friction, such as when the brake lining is cold):

Brake torque($N \cdot m$)=radius($m$)·Brake force($n$)·Coefficient of friction·Number of Friction Surfaces·Temperature-based modifier      (Equation 2)

Brake torque($N \cdot m$)=1,100$N \cdot m$=0.15$m$·Brake force($n$)·0.5·2·1.2

This results in a modified brake force of 6,111 N, which is less than the unmodified or uncompensated value derived above. Stated differently, the method detects a cold brake lining 32 and assumes that the corresponding coefficient of friction is higher than a normal baseline value. Thus, step 130 compensates for the expected increase in the coefficient of friction by requesting less brake force from the vehicle brake assembly than it normally would. This is accomplished through modified command signals and is intended to avoid the brake grab phenomenon described before.

Next, step 140 operates vehicle brake system 50 according to the modified brake command signals; this may be accomplished in a number of different ways. For example, step 140 could send modified brake command signals to a hydraulic unit 72 in an electrohydraulic braking (EHB) system so that the hydraulic unit controls a brake force according to the modified brake command signal. More specifically, electronic brake control module (EBCM) 70 could generate modified brake command signals and provide them to hydraulic control unit 90, which then uses the modified brake command signals to drive hydraulic pump 92, as well as numerous solenoids, valves, etc., in order to control the fluid pressure in hydraulic lines 74. This, in turn, affects the brake force that brake pads 20, 22 exert against rotor 14. In a different example, step 140 could send modified brake command signals to a control unit or driver in an electromechanical braking (EMB) system so that an electric motor controls a brake force according to the modified brake command signal. More specifically, electronic brake control module (EBCM) 70 could generate modified brake command signals and provide them to an electronic module associated with a particular wheel, for instance. The electronic module could then use the modified brake command signals to operate an electric motor that controls the force with which brake pads 20, 22 contact rotor 14. These are only some of the possibilities, as other techniques may be used to control vehicle brake system 50 with modified brake command signals.

The preceding examples, equations, and sequences of steps are provided purely for purposes of illustration. Skilled artisans will appreciate that the actual computations made by vehicle brake system 50 could be significantly more involved and more complex than those discussed above. Those skilled in the art will also appreciate that although the foregoing explanation is directed to the control of a single vehicle brake assembly (i.e., a single wheel or corner), the disclosed method may be similarly applied to all four vehicle wheels. For example, method 100 may be used to control all four of the vehicle's brake assemblies or it may be used to control less than all of them (e.g., it could control only the front brake assemblies or an individual brake assembly). Equations 1 and/or 2 may also take a number of other factors or variables into consideration. It is also possible for exemplary method 100 to include a different combination and/or sequence of steps, including combinations that have greater, fewer or different steps than those disclosed here.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for operating a vehicle brake system, comprising the steps of:
   (a) determining a brake temperature by averaging temperature signals for the front brake assemblies to generate an average front brake temperature, averaging temperature signals for the rear brake assemblies to generate an average rear brake temperature, and using at least one vehicle operating condition to dynamically select between the average front brake temperature and the average rear brake temperature;
   (b) determining a temperature-based modifier, wherein the brake temperature is used to determine the temperature-based modifier;
   (c) generating a modified brake command signal, wherein the temperature-based modifier is used to generate the modified brake command signal; and
   (d) operating the vehicle brake system according to the modified brake command signal.

2. The method of claim 1, wherein step (a) further comprises determining a brake temperature by receiving temperature signals from a brake temperature sensor that senses the temperature of a brake lining or a brake rotor.

3. The method of claim 1, wherein step (a) further comprises determining a brake temperature by receiving temperature signals from an electronic module that estimates the temperature of a brake lining or a brake rotor.

4. The method of claim 1, wherein step (b) further comprises determining the temperature-based modifier by correlating the brake temperature to changes in a coefficient of friction of a brake pad and rotor.

5. The method of claim 4, wherein the brake temperature and the changes in the coefficient of friction are correlated using a look-up table.

6. The method of claim 4, wherein the temperature-based modifier is less than 1.0 when there is a decrease in the coefficient of friction of the brake pad and rotor, and the temperature-based modifier is greater than 1.0 when there is an increase in the coefficient of friction of the brake pad and rotor.

7. The method of claim 1, wherein step (c) further comprises generating the modified brake command signal so that it requests more brake force as a coefficient of friction of a brake pad and rotor decreases and requests less brake force as the coefficient of friction increases.

8. The method of claim 1, wherein step (d) further comprises operating the vehicle brake system by sending the modified brake command signal to a hydraulic unit in an electrohydraulic braking (EHB) system so that the hydraulic unit controls a brake force according to the modified brake command signal.

9. The method of claim 1, wherein step (d) further comprises operating the vehicle brake system by sending the modified brake command signal to an electric motor in an electromechanical braking (EMB) system so that the electric motor controls a brake force according to the modified brake command signal.

10. A method for operating a vehicle brake system, comprising the steps of:
  (a) determining a brake temperature by averaging temperature signals for the front brake assemblies to generate an average front brake temperature, averaging temperature signals for the rear brake assemblies to generate an average rear brake temperature, and using criteria determined during vehicle design or manufacture to statically select between the average front brake temperature and the average rear brake temperature;
  (b) determining a requested brake torque;
  (c) generating a modified brake command signal, wherein the brake temperature and the requested brake torque are used to generate the modified brake command signal; and
  (d) operating the vehicle brake system according to the modified brake command signal.

11. The method of claim 10, wherein step (a) further comprises determining a brake temperature by receiving temperature signals from a brake temperature sensor that senses the temperature of a brake lining.

12. The method of claim 10, wherein step (a) further comprises determining a brake temperature by receiving temperature signals from an electronic module that estimates the temperature of a brake lining.

13. The method of claim 10, wherein step (c) further comprises determining a temperature-based modifier by correlating the brake temperature to changes in a coefficient of friction of a brake pad and rotor, wherein the brake temperature, the requested brake torque, and the temperature-based modifier are used to generate the modified brake command signal.

14. The method of claim 13, wherein the brake temperature and the changes in the coefficient of friction are correlated using a look-up table.

15. The method of claim 13, wherein the temperature-based modifier is less than 1.0 when there is a decrease in the coefficient of friction of the brake pad and rotor, and the temperature-based modifier is greater than 1.0 when there is an increase in the coefficient of friction of the brake pad and rotor.

16. The method of claim 10, wherein step (c) further comprises generating the modified brake command signal so that it requests more brake force as a coefficient of friction of a brake pad and rotor decreases and requests less brake force as the coefficient of friction increases.

17. The method of claim 10, wherein step (d) further comprises operating the vehicle brake system by sending the modified brake command signal to a hydraulic unit in an electrohydraulic braking (EHB) system so that the hydraulic unit controls a brake force according to the modified brake command signal.

18. The method of claim 10, wherein step (d) further comprises operating the vehicle brake system by sending the modified brake command signal to an electric motor in an electromechanical braking (EMB) system so that the electric motor controls a brake force according to the modified brake command signal.

19. A brake-by-wire vehicle brake system, comprising:
  a brake pedal sensor for providing a brake signal;
  a brake temperature sensor for providing a temperature signal;
  an electronic brake control module (EBCM) coupled to the brake pedal sensor and to the brake temperature sensor; and
  a vehicle brake assembly having a brake pad and a rotor, wherein the EBCM uses at least one vehicle operating condition selected from the list consisting of: a vehicle speed, a vehicle acceleration, a steering angle or a desired braking to select the temperature signal, and uses the brake signal and the selected temperature signal to generate a modified brake command signal that compensates for temperature-related changes in a coefficient of friction of the brake pad and the rotor.

* * * * *